Aug. 28, 1962  L. CRANSTON  3,051,512
EXPANSION JOINT
Filed March 20, 1958
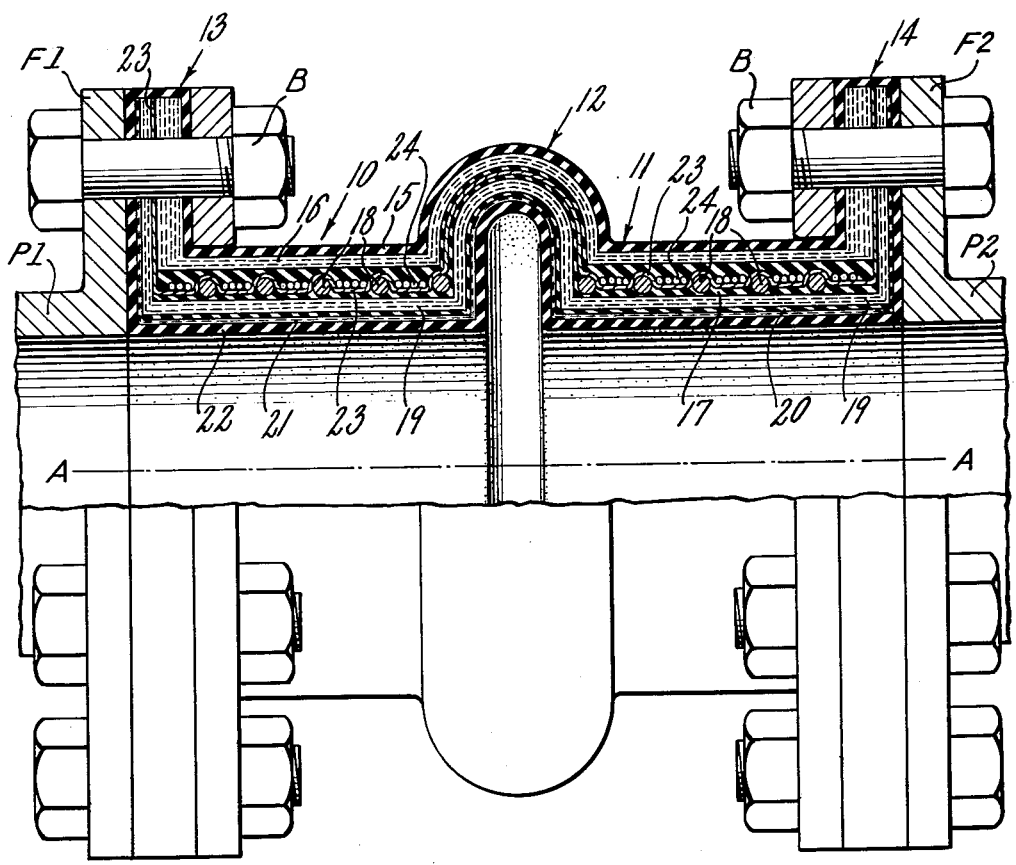
INVENTOR.
LAWRENCE CRANSTON
BY
Irwin M. Lewis
ATTORNEY 3,051,512
EXPANSION JOINT
Lawrence Cranston, Glen Rock, N.J., assignor to United States Rubber Company, New York, N.Y., a corporation of New Jersey
Filed Mar. 20, 1958, Ser. No. 722,806
1 Claim. (Cl. 285—114)

This invention relates to flexible, reinforced rubber expansion joints of the type having a central annular arch portion interconnecting cylindrical flanged portions. Such joints are commonly used to absorb vibration, permit expansion or contraction, or compensate for misalignment in pipe lines and associated equipment.

More particularly the invention relates to expansion joints of the type disclosed in United States Patent No. 1,696,435 which incorporate axially spaced, metal reinforcing rings in the cylindrical wall portions thereof to provide additional strength.

It has been found that on continued use of such joints, the metal reinforcing rings thereof migrate towards the ends of the joint with the result that weak, unreinforced portions are left which eventually rupture.

It has heretofore been proposed to prevent such migration of the reinforcing rings by providing coils of wire which fill up all the space between the rings and thereby prevent migration thereof toward the ends. The use of such coils of wire however results in a relatively heavy, inflexible, expensive joint.

The object of the present invention is to provide an improved construction which will effectively prevent such migration of the reinforcing rings without materially affecting the flexibility of the joint and which at the same time will reinforce the cylindrical portion against axial elongation.

Other objects and advantages of the invention will become apparent from the following description when read in conjunction with the accompanying drawing which is a view partly in section and partly in elevation showing the expansion joint of the present invention interconnecting two sections of pipe.

Referring to the drawing, the expansion joint includes two flanged, generally cylindrical, portions 10 and 11 which are connected together by a central arch portion 12.

In the drawing, the expansion joint is shown used to couple two pipes P1 and P2 together by bolting flanges 13 and 14 of cylindrical portions 10 and 11 to flanges F1 and F2 of the pipes. Flanges 13 and 14, as well as the pipe flanges F1 and F2, are provided with suitable bolt holes through which coupling bolts B may pass.

The expansion joint, for the most part, is of conventional laminated construction and includes an outer rubber cover 15, a layer of rubber coated or impregnated fabric plies 16, a layer of soft filler rubber 17 in which circumferentially extending, axially spaced metal reinforcing rings 18 are imbedded, a second layer of rubber coated or impregnated fabric plies 19, a layer of rubber 20, a fabric breaker ply 21 and an inner rubber cover 22.

The novel feature of the expansion joint resides in the use of a layer 23 of longitudinally extending metallic wires which are pulled down between rings 18 by circumferentially extending metallic wires 24.

The wires of layer 23 and the binding wires 24 are preferably stranded, flexible steel wires which have been brass plated to increase adhesion with the rubber. The wires of layer 23 being pulled down between the rings 18 and bound down by the circumferentially wound wire 24 effectively anchor the rings 18 against migration in either direction even though relatively light flexible wire is used. As the wires 23 extend longitudinally, i.e., at an angle not greater than 40° to the longitudinal axis A—A of the expansion joint, they prevent substantial axial elongation of the cylindrical portions 10 and 11. The wires of the layer 23 may be straight laid in side-by-side relationship or may be braided. In the flanges 13 and 14, the wires of the layer 23 extend between the bolt holes.

The wires of layer 23 and the binding wires 24 are conveniently incorporated as the various layers of the joint are built up on a suitable form in the conventional manner. After the joint has been built up from the various layers, the rubber is vulcanized so that the joint becomes essentially an integral structure.

While a preferred embodiment of the invention has been shown and described, it will be appreciated that variations can be made therein without departing from the scope of the invention. For example, while the invention has been shown and described in conjunction with an expansion joint having a single arch portion, it will be appreciated that the invention is equally applicable to expansion joints of the multiple arch type having two or more arch portions joined together by cylindrical portions as described in connection with the single arch type. Similarly the arch portions may be of the filled type, i.e., filled with a relatively soft rubber, or may be unfilled as shown in the drawing. The term "rubber" has been used in a generic sense to include natural rubber synthetic rubber (such category including silicone rubber, chlorotrifluoroethylene-vinylidene fluoride copolymer rubbers, chlorosulfonated polyethylene rubber, etc.) and blends thereof.

Having thus described my invention, what I claim and desire to protect by Letters Patent is:

In an expansion joint of the type formed of plies of rubber and fabric and having an annular arch portion interconnecting generally cylindrical portions, said cylindrical portions having axially spaced circumferentially extending metal reinforcing rings embedded therein, the improvement comprising an embedded layer of longitudinally extending wires extending from one end of the joint to the other over the outer surfaces of said rings and bound down between and engaging the outer surfaces of said rings by wires which are embedded in said plies of said joint and are wound circumferentially of the joint between said rings.

References Cited in the file of this patent
UNITED STATES PATENTS

| | | |
|---|---|---|
| 986,081 | Patterson | Mar. 7, 1911 |
| 992,426 | James | May 16, 1911 |
| 1,345,971 | Star | July 6, 1920 |
| 1,696,435 | Fraley | Dec. 25, 1928 |
| 2,585,509 | Smith | Feb. 12, 1952 |
| 2,692,782 | Jones | Oct. 26, 1954 |
| 2,825,364 | Cullen | Mar. 4, 1958 |